May 12, 1970 R. C. TRINGALI ET AL 3,511,532
FOLDING TABLE WITH SEATS
Filed Feb. 5, 1968 9 Sheets-Sheet 1

INVENTORS
RICHARD C. TRINGALI
JOSEPH E. WACHTEL
BY
Hibben, Noyes & Bicknell
ATTYS.

May 12, 1970  R. C. TRINGALI ET AL  3,511,532
FOLDING TABLE WITH SEATS

Filed Feb. 5, 1968  9 Sheets-Sheet 9

United States Patent Office 3,511,532
Patented May 12, 1970

3,511,532
FOLDING TABLE WITH SEATS
Richard C. Tringali, Manitowoc, and Joseph E. Wachtel, Two Rivers, Wis., assignors, by mesne assignments, to American Hospital Supply Corporation, Evanston, Ill., a corporation of Illinois
Filed Feb. 5, 1968, Ser. No. 703,054
Int. Cl. A47b 39/06, 3/00
U.S. Cl. 297—159        20 Claims

ABSTRACT OF THE DISCLOSURE

This disclosure deals with a folding table assembly including a pair of table top sections which have their adjacent ends hinged together and are supported for folding movement between open and closed positions. The assembly further includes two sections of seats on at least one side of the table, one seat section of each pair being associated with each top section and the seat sections folding toward each other as the assembly is moved to the closed position. The seat sections are longitudinally aligned when the table is open, and means is provided to laterally shift the seat sections relative to each other to permit the assembly to be folded with the seat sections in overlapping relation to avoid interference between the two seat sections.

---

Folding table assemblies have been provided, including foldable table top sections and attached seat sections which fold with the top sections. For example, the Katzfey et al. Pat. No. 3,337,262 discloses such an assembly including interchangeable seat sections of different types. Each seat section includes a number of seats and a supporting frame which extends to the floor to support the seats when the assembly is open. A pair of seat sections are provided on at least one side of the table, one seat section of the pair extending in each direction from the hinge or folding axis of the assembly.

In such an assembly the seats of each pair of seat sections are preferably longitudinally aligned when the assembly is open, such alignment being desirable because all of the seats on each side of the table should be the same distance from the top sections. However, where the supporting frames of a pair of seat sections fold together in overlapping relation as the assembly is folded, the supporting frame of one seat section must be offset relative to the other so that they may overlap without interference as the assembly is being folded. Thus, the longitudinal alignment of the seats and the offset of the supporting frames resulted, in the Katzfey et al. table in an unbalanced construction of the seats relative to the associated supporting frames, and relatively complex supporting frames for the seat sections.

In accordance with the present invention, a folding table assembly including attached seat sections is provided, wherein both the seats and the supporting frames of a pair of seat sections are longitudinally aligned when the table is open. Such longitudinal alignment of both the seats and the supporting frames permits standardization and simplification of the seat sections. To prevent interference between the supporting frames of a pair of seat sections as the assembly is folded, means is also provided to shift at least one of the seat sections of a pair relative to the other to permit the assembly to be closed.

The assembly further includes improved structure for increasing the stability of the assembly when folded, for adjusting the height of the table top sections when the assembly is open, for rotatably fastening chairs on the frames, and for locking the assembly in the open position.

Further advantages of the invention will become apparent from the following description taken in conjunction with the accompanying figures of the drawings, in which.

In FIGS. 1 to 6, a folding table assembly embodying the invention is shown, which comprises a table supporting structure 31 and a pair of table top sections 32 and 33. The supporting structure 31 comprises a center leg support 34 and two outer end leg supports 36 and 37 which engage the floor and support the table top sections 32 and 33 in horizontally aligned end-to-end relation when the assembly is open.

Figure 2:
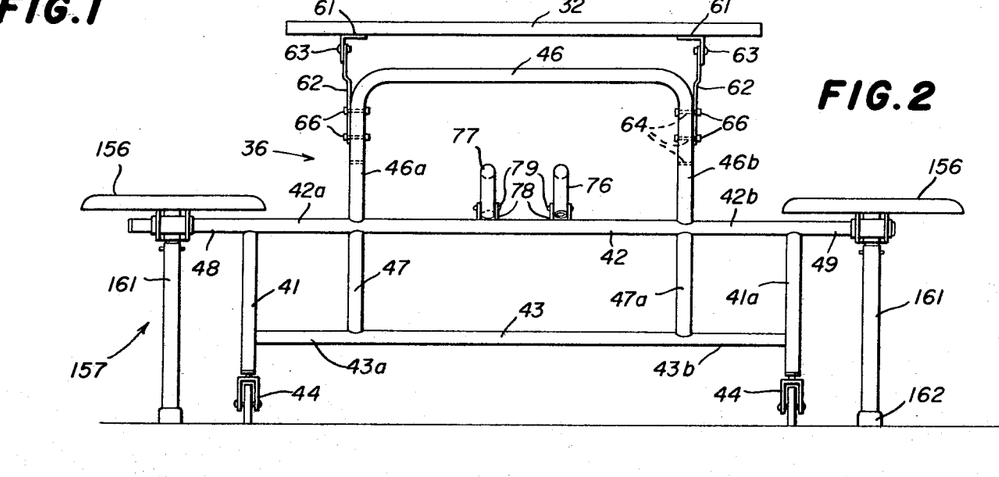
FIG. 2 is an elevational view taken on the line 2—2 of FIG. 1.

Each outer end leg support 36 and 37 comprises a pair of laterally spaced vertically extending legs 41 and 41a and a pair of vertically spaced cross braces 42 and 43 (FIG. 2). The cross braces 42 and 43 extend laterally of the table with the cross brace 42 being rigidly secured to the upper ends of the two legs 41 and 41a and the other cross brace 43 being spaced below the brace 42 and having its ends secured to the legs 41 and 41a. The legs 41 and 41a may be made, for example, of tubular metal, and casters 44 are secured to the lower ends of the legs 41 and 41a. Each end leg support 36 and 37 further includes an inverted U-shaped support 46 which extends upwardly from the upper surface of the upper cross brace 42, its arms 46a and 46b being rigidly secured to the brace 42. Vertically extending braces 47 and 47a are preferably secured between the two cross braces 42 and 43 in vertical alignment with the arms 46a and 46b of the support 46 in order to further strengthen the end leg supports. As shown in FIG. 2 the support 46 and the braces 47 and 47a are spaced equal distances from the legs 41 and 41a.

To add stability to the assembly when folded (FIG. 4) the end portions 43a and 43b (FIGS. 1, 2 and 5) of the lower cross brace 43 are bent to slant laterally and longitudinally toward the adjacent corners of the assembly, so that the legs 41 and 41a at the ends of the brace 43 are offset both longitudinally and laterally from the support 46. Similarly, the end portions 42a and 42b of the upper cross brace 42 are bent to extend first longitudinally outwardly and then laterally outwardly over the upper ends of the legs 41 and 41a to which they are secured. Further, the end portions 42a and 42b include extensions 48 and 49 which project laterally outwardly and are attached to seat sections, as will be described hereinafter.

The center leg support 34 (FIGS. 1 and 6) comprises an upper portion 51 and a lower portion 52 which is movably connected to the upper portion 51. The lower portion 52 comprises a pair of uprights 53 and 53a which are secured together by a lower cross brace 54, and the upper portion 51 comprises a pair of tubular slide members 56 and 56a which are secured together by an upper cross brace 57. The uprights 53 and 53a of the lower portion 52 are disposed in telescoping relation within the slide member 56 and 56a respectively. Counterbalancing springs (not shown) are preferably positioned within the slide members 56 and 56a to assist in moving the assembly to the open and folded positions. The upper ends of the slide members 56 and 56a are covered by channel-shaped cap members 58 and 58a which are rigidly secured thereto. The lower ends of the uprights 53 and 53a are preferably provided with cups 59 made of a high friction material, which engage the floor when the assembly is in its open position and restrain unwanted movement of the assembly. The center leg support 34 further includes a pair of yoke or Y-shaped seat attachment members 60 and 60a (FIGS. 5 and 6) which are secured to and extend laterally outwardly from the outer sides of the slide members 56 and 56a.

The supporting structure 31 of the table further comprises two pairs of aprons 61, the aprons of each pair being laterally spaced. Further, the two pairs extend in horizontal end-to-end relation when the assembly is in its open position and extend substantially vertically when the assembly is in its folded or closed position. Each apron 61 has an angle-shaped cross section and includes a vertically disposed arm which is pivotally connected to the outer and center leg supports and a horizontally disposed arm which is secured to the table top sections 32 and 33 as by screws. As shown in FIGS. 1, 2, 10 and 11, the outer ends of the aprons 61 are connected to the outer end leg supports 36 and 37 by vertically extending links 62 which have their upper ends pivotally connected to the aprons 61 as by pins 63. The lower ends of the links 62 extend closely adjacent the upper ends of the arms 46a and 46b of the supports 46, and three laterally extending holes 64 are formed through each arm 46a and 46b. Two holes 65 are formed through the lower ends of each link 62, the spacing between the holes 65 being equal to the spacing between adjacent holes 64, and bolts 66 are provided to attach the links 62 to the supports 46. Thus, the links 62 and the outer ends of the aprons may be adjusted to an upper position where the bolts 66 are in the upper two of the three holes 64, or in a lower position where the bolts 66 are in the lower two of the three holes 64.

Figure 1:
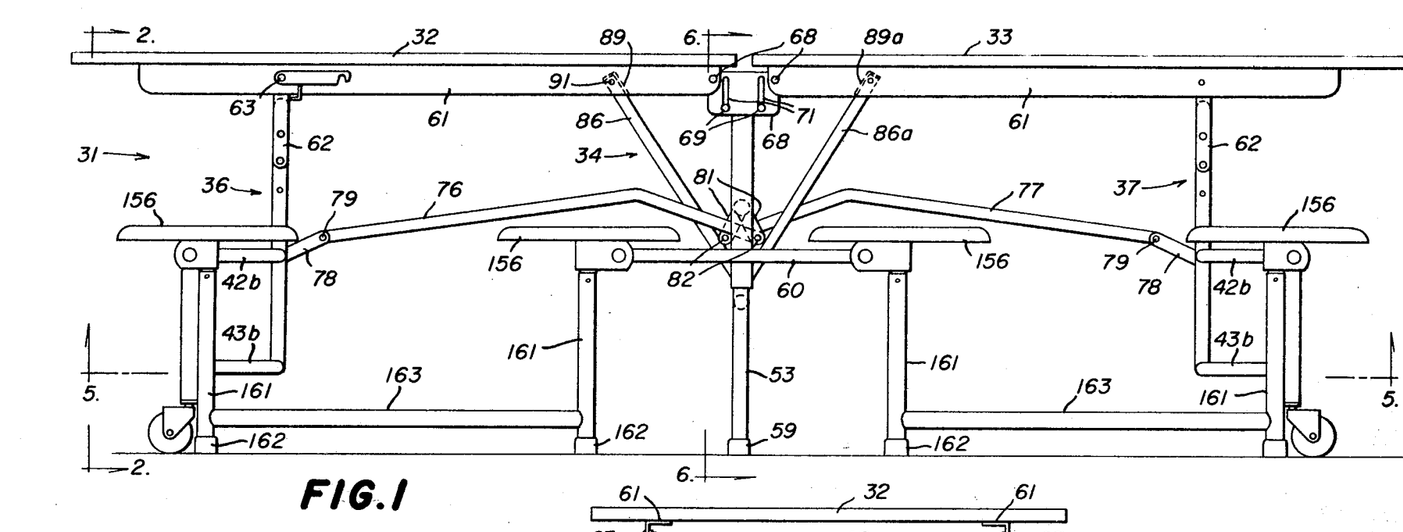
FIG. 1 is a side elevational view of a folding table assembly embodying the invention.
Figures 10, 12:
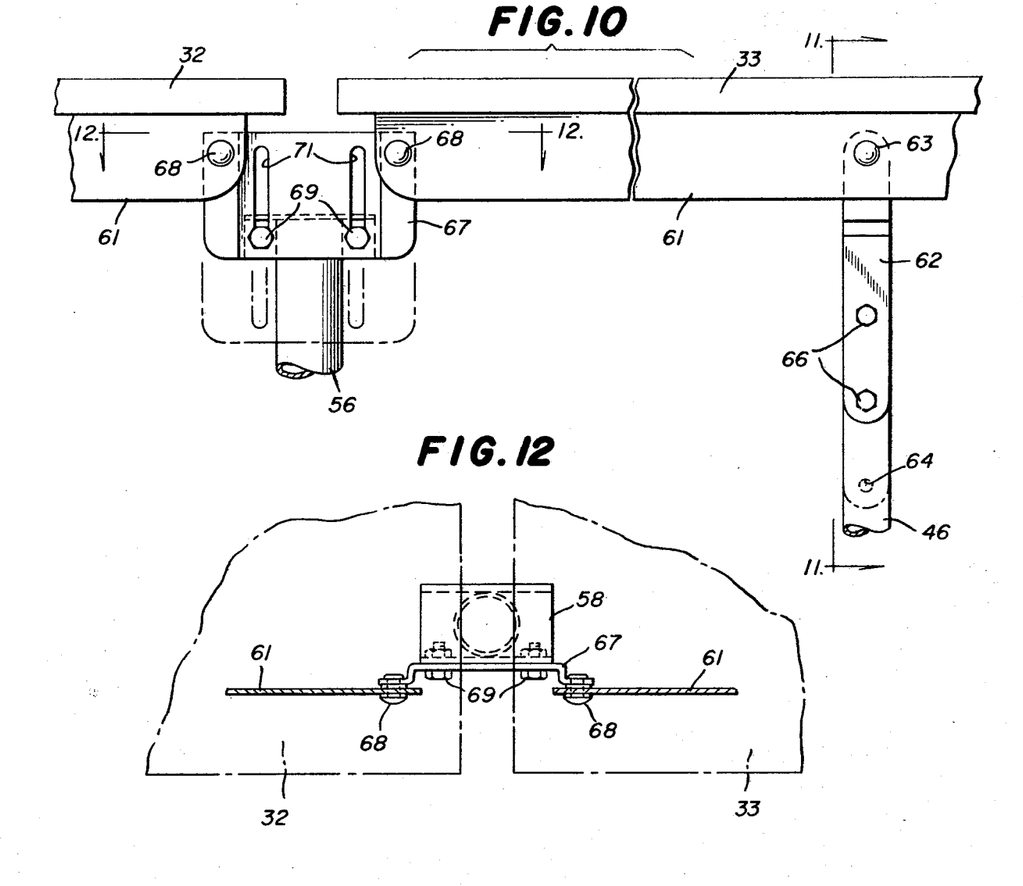
FIG. 10 is an enlarged fragmentary view showing another portion of the assembly.
FIG. 12 is a fragmentary sectional view taken on the line 12—12 of FIG. 10.
Figure 11:
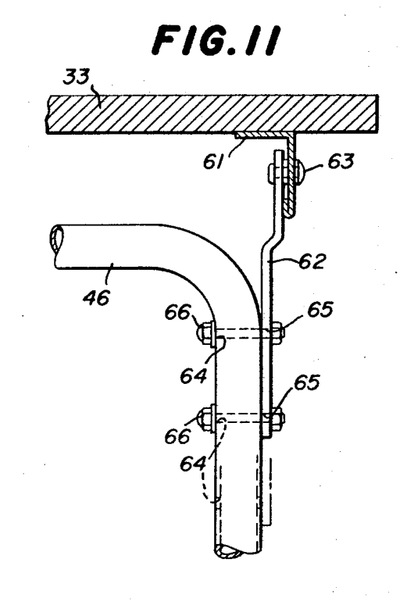
FIG. 11 is a fragmentary sectional view taken on the line 11—11 of FIG. 10.

The height of the inner ends of the aprons 61 may also be adjusted relative to the center leg support 34. With reference to FIGS. 1, 10 and 12 the inner ends of the aprons 61 are connected to the caps 58 and 58a of the center leg support 34 through adjusting plates 67. As best shown in FIGS. 10 and 12, each adjusting plate 67 is pivotally connected to the adjacent ends of the aprons 61 as by pins 68, and is slidably connected to the laterally outer side of the associated cap by bolts 69 (FIG. 1). Two vertically elongated slots 71 are formed in each adjusting plate 67, and the bolts 69 extend through the slots 71. Thus, the vertical height at the center of the table of the aprons 61 and the table top sections 32 and 33 may be adjusted by loosening the bolts 69, shifting the adjusting plates 67 upwardly or downwardly to the desired height and then retightening the bolts 69.

Figure 5:
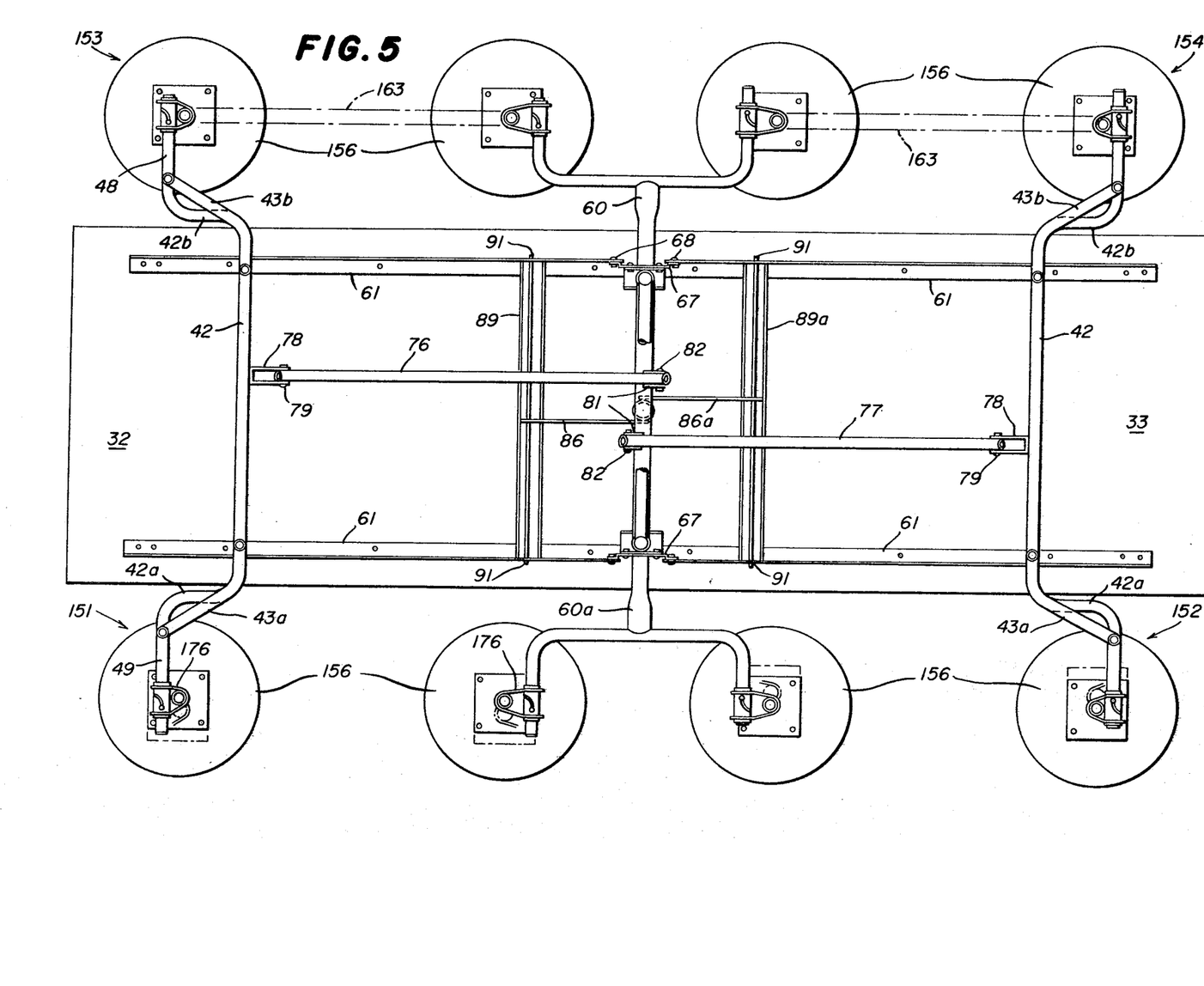
FIG. 5 is a sectional view taken on the line 5—5 of FIG. 1.
Figure 6:
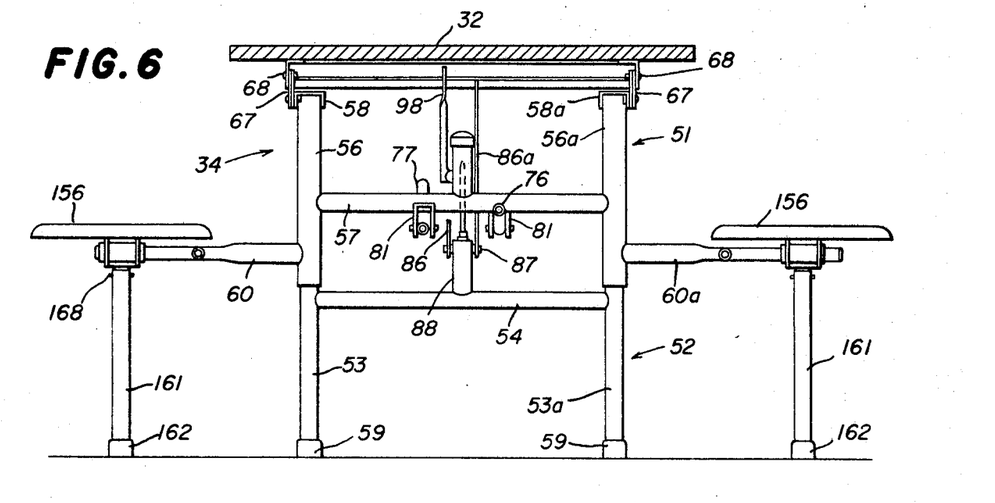
FIG. 6 is a sectional view taken on the line 6—6 of FIG. 1.

The outer end leg supports 36 and 37 and the center leg support 34 are further interconnected by a pair of stretcher bars 76 and 77 (FIGS. 1 and 5) which extend longitudinally of the assembly and are intermediate the sides of the assembly. The outer ends of the stretcher bars 76 and 77 are respectively connected to the end leg supports 36 and 37 for pivotal movement and are both pivotally connected to the center leg support 34. At each outer end leg support, a U-shaped support bracket 78 is rigidly secured to the upper cross brace 42 and angles upwardly and toward the center leg support 34 (see FIG. 1). Each stretcher bar has its outer end pivotally connected to the arms of the associated bracket 78 by a pin 79. At the center leg support 34, the inner end of each stretcher bar 76 and 77 is pivotally connected to the upper cross brace 57 by a U-shaped bracket 81 (FIGS. 5 and 6) which angles downwardly and away from its associated stretcher bar. The upper end of each bracket 81 is rigidly secured to the underside of the cross brace 57, and the lower end of each bracket 81 is pivotally connected to a stretcher bar by a pin 82. As shown in FIGS. 2, 5 and 6, the stretcher bars 76 and 77 and the brackets 78 and 81 are laterally spaced on opposite sides of the center line of the table to prevent interference therebetween. The center portions of the stretcher bars are bowed upwardly so that they will clear the brace 54 of the center leg support when the assembly is folded, and the inner ends of the stretcher bars 76 and 77 cross each other. The pins 79 and 82 at the ends of each stretcher bar, and the pins 63 and 68 connecting the aprons 61 with the leg supports are located to substantially define a parallelogram.

Equalizing means is also provided to maintain the center and the outer end leg supports in substantially vertical positions throughout the opening and folding movements of the assembly. The equalizing means comprises two links 86 and 86a (FIGS. 1, 3, 5 and 6), each link 86 and 86a being connected between the pair of aprons 61 for one table top section and the center leg support 34. The lower end of each link is pivotally connected by means of a pin 87 to a tubular rod retainer 88 (FIGS. 13 and 14) which is rigidly secured to the upper side of the lower cross brace 54, the rod retainer 88 being part of an open position locking mechanism to be described hereinafter. From the rod retainer 88, the links 86 and 86a slant, when the assembly is open, upwardly and longitudinally toward the respective ends of the table. The upper ends of the links 86 and 86a are secured as by welding to angle-shaped cross members 89 and 89a, respectively, which extend laterally of the table between the aprons 61. Each cross member 89 and 89a is pivotally connected to the associated pair of aprons by pins 91 which are secured to the cross members 89 and 89a and extend through holes formed in the vertical arms of the aprons 61.

Figure 3:
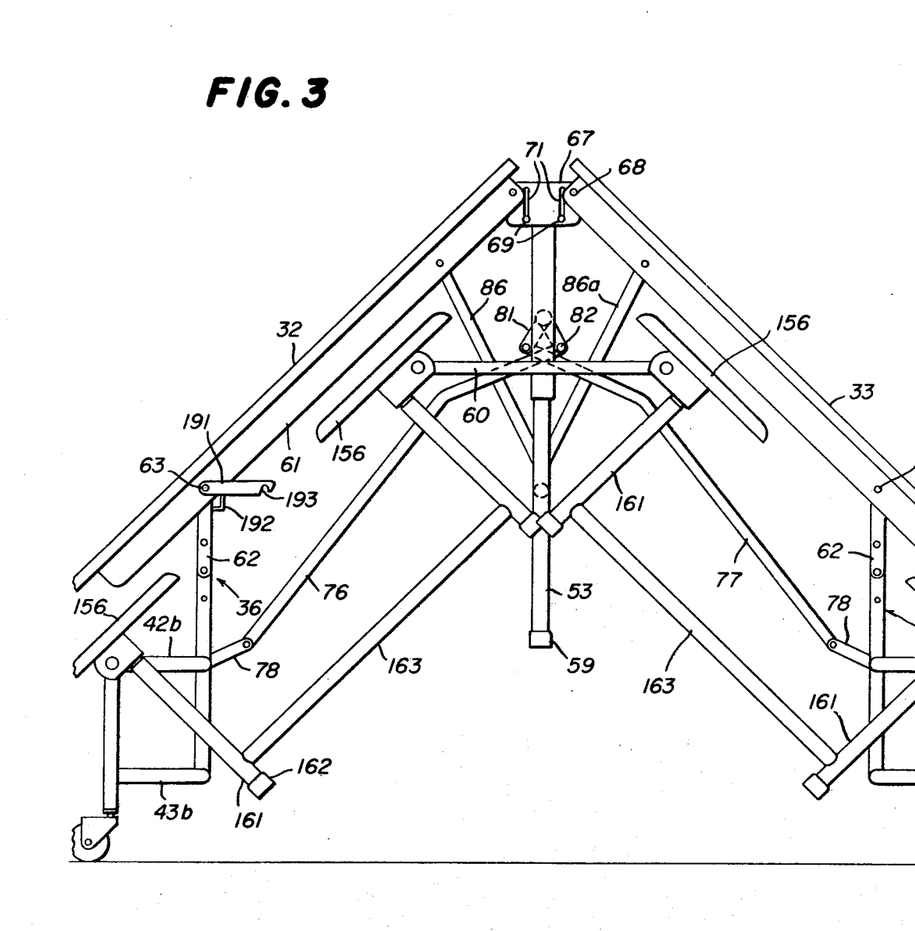
FIG. 3 is a side elevational view showing the assembly in a partially folded position.
Figure 4:
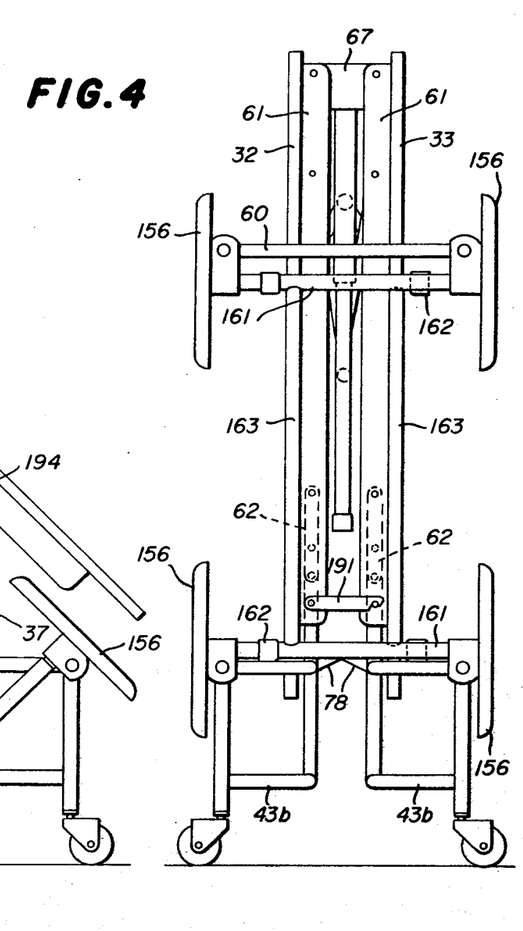
FIG. 4 is a side elevational view showing the assembly in its fully folded position.

With the foregoing construction, the assembly may be moved from its open position, shown in FIG. 1, through an intermediate position, shown in FIG. 3, to a folded or closed position shown in FIG. 4. As the assembly is moved from the open position to the closed position, the center leg support 34 rises and the upper ends of the links 86 and 86a swing downwardly and inwardly relative to the upper end of the center leg support 34. Simultaneously, the lower ends of the links 86 and 86a move downwardly, thereby causing the lower portion 52 of the center leg support 34 to move downwardly relative to the upper portion 51. Further, the links 86 and 86a maintain the center leg support 34 in a vertical plane during the opening and closing movements of the assembly, and the outer end leg supports 36 and 37 are similarly held in vertical planes due to the connections of the stretcher bars 76 and 77 between the end leg supports and the center leg support. Interference between the links 86 and 86a and the stretcher bars 76 and 77 is prevented during such opening and closing movements by positioning the stretcher bars and the links in laterally spaced relation to each other.

Figure 13:
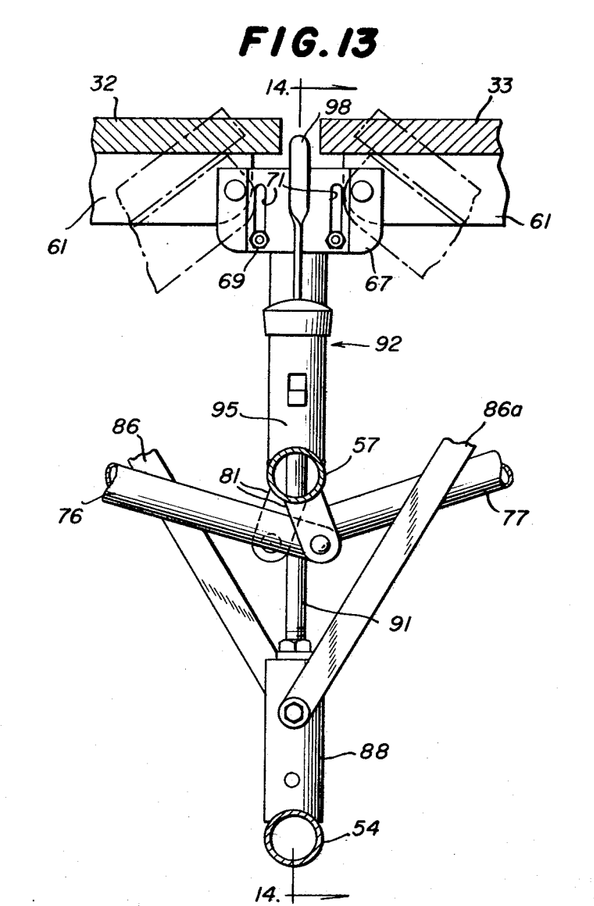
FIG. 13 is an enlarged fragmentary view of still another portion of an assembly.
Figure 14:
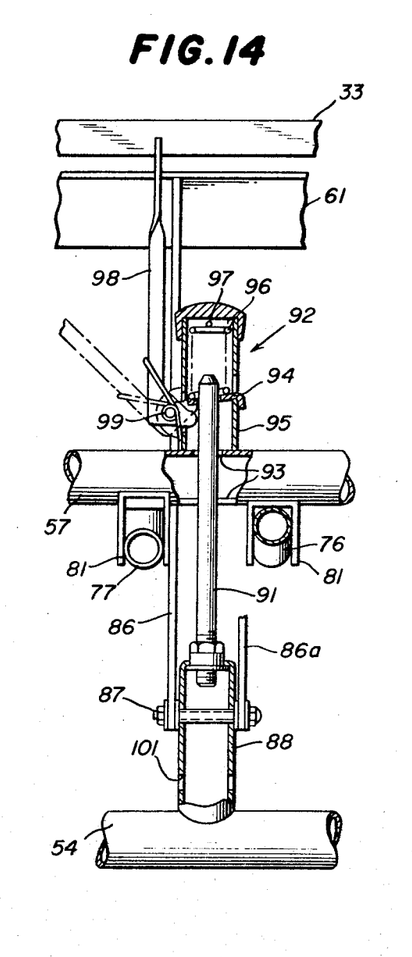
FIG. 14 is a sectional view taken on the line 14—14 of FIG. 13.

The table assembly further includes an open position locking mechanism shown in detail in FIGS. 6, 13 and 14. The locking mechanism comprises a rod or plunger 91 secured to and extending upwardly from the upper end of the rod retainer 88, and a releasable catch mechanism 92 secured to the upper side of the upper cross brace 57 of the center leg support. A vertically extending hole 93 is formed through the upper cross brace 57, and the plunger 91 is mounted to extend through the hole 93 when the assembly is in its open position. The catch mechanism 92 includes a tubular housing 95 positioned on top of the cross brace 57 over the hole 93, and catch means in the housing 95 adapted to engage and tightly grip the upper end portion of the plunger 91 when the assembly is in its open position. The catch means comprises a washer 94 pivotally connected to the housing 95 and having a hole or aperture formed therein. The plunger 91 extends through the hole (see FIG. 14), the edges of the hole in the washer being adapted to bite into the plunger 91 when the axis of the plunger 91 is substantially out of alignment with the axis of the hole in the washer 94. A compression spring 96 is positioned between the upper side of the washer 94 and a pin 97 and normally urges the washer to such an unaligned position. To release the catch means when the assembly is to be moved to its closed position, a release handle 98 is pivotally connected by a pin 99 on the outside of the housing 95, the handle 98 extending upwardly from the housing to a position intermediate the adjacent ends of the table top sections 32 and 33 (FIG. 13). The lower end of the handle 98 extends into the housing 95 through a hole in the side thereof underneath the washer 94, and pivotal movement of the handle 98 on the pin 99 from the solid line position shown in FIG. 14 to the dashed line position causes the lower end of the handle 98 to pivot the washer 94 to a position where the axis of the hole in the washer and the axis of the plunger 91 are substantially in alignment. When such alignment is attained, the washer 94 releases the plunger 91 and thus permits closing movement of the assembly.

When the assembly is in its closed position, shown in FIG. 4, the two cross braces 54 and 57 of the center leg support are a substantial distance apart and the plunger 91 is withdrawn from the catch mechanism 92. As the assembly is moved to its open position, the plunger 91 moves upwardly relative to the catch mechanism 92 and the cross brace 57, enters the hole 93 in the cross brace 57, and engages the washer 94 of the catch mechanism 92. The assembly will then remain locked in its open position until the handle 98 is pivoted to cause a washer 94 to release its grip on the plunger 91.

As previously stated, the lower ends of the two links 86 and 86a are pivotally connected to the rod retainer 88, and it was also stated that the aprons 61 and the top sections 32 and 33 attached thereto may be vertically adjusted between two vertically spaced positions. Since the two links 86 and 86a are connected to and must be vertically adjustable with the aprons 61, means is provided for making an adjustment at the connection between the links 86 and 86a and the rod retainer 88. As shown in FIGS 13 and 14, two vertically spaced holes 101 are formed through the rod retainer 88, the vertical distance between the holes 101 being substantially equal to the height of the slots 71 in the plates 67. When the table top sections 32 are in the upper of their two positions, the pin 87 is located in the upper of the two holes 101, whereas the pin 101 is positioned in the lower of the two holes 101 when the table top sections are in the lower of their two positions.

Figure 15:
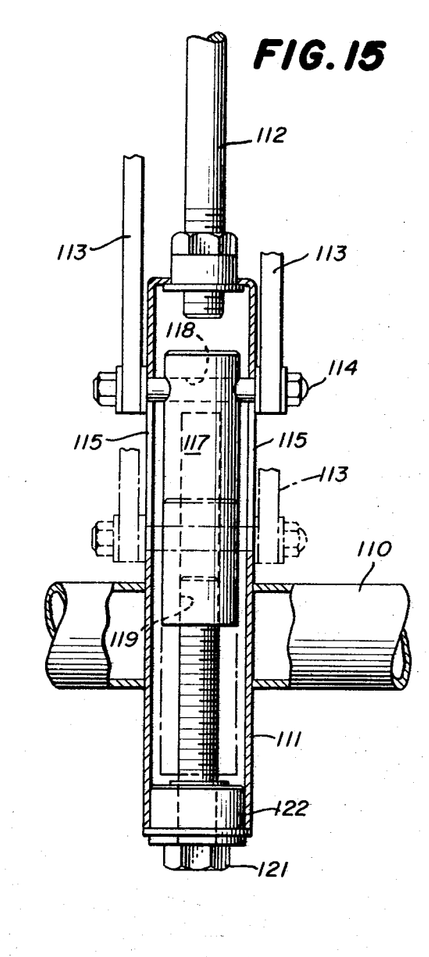
FIG. 15 is an enlarged view of an alternate form of the portion of the assembly shown in FIGS. 13 and 14.

FIG. 15 illustrates an alternate device for vertically adjusting the location of the lower ends of the links 86 and 86a on the rod retainer. In FIG. 15, a table assembly is shown including a cross brace 110 which corresponds to the cross brace 54 of the table assembly shown in FIGS. 1 through 14, and a tubular rod retainer 111 which is secured to the cross brace 110. The cross brace 110 may be formed in two sections of substantially equal length, with the rod retainer 111 positioned between the adjacent ends of the two portions of the cross brace 110 and secured thereto. The rod retainer 111 extends vertically both upwardly and downwardly from the cross brace 110, and a plunger 112, which corresponds to the plunger 91, is rigidly secured to the upper end of the retainer 111. A pair of links 113, which correspond to the links 86 and 86a slant upwardly from a laterally extending pin 114 which corresponds to the pin 87. Vertically elongated slots 115 are formed through opposite sides of the rod retainer 111, and the pin 114 extends through the two slots 115 with the links 113 pivotally connected to the opposite ends of the pin 114.

Within the rod retainer 111 is an adjusting block 117 which has a laterally extending hole 118 formed therethrough adjacent its upper end, the pin 114 extending through the hole 118. A vertically extending internally threaded hole 119 is formed in the lower end of the adjusting block 117, and a bolt 121 is threaded into the hole 119. The bolt 121 extends downwardly out of the rod retainer 111 and is mounted in a bolt support 122 which holds the bolt 121 against axial movement but permits rotative movement of the bolt 121 relative to the support 122. The disposition of the pin 114 in the slots 115 of course prevents rotative movement of the block 117 but permits axial movement of the block 117 for the length of the slots 115. Thus, turning movement of the bolt 121 causes the block 117 and the pin 114 to move either upwardly or downwardly, depending upon direction of rotation of the bolt 121, and, consequently, vertical movement of the pin 114. The bolt 121 preferably includes a hexagonal head which is accessible from the lower end of the rod retainer 111 for adjustment of the block 117 and the pin 114.

FIGS. 16 through 19 illustrate an alternate catch mechanism for releasably clamping the upper end of the plunger of an open position locking mechanism. In FIGS. 16 to 19, a folding table assembly is illustrated including an upper cross brace 126 and a lower cross brace 127 which correspond respectively to the center leg cross braces 57 and 54 shown in FIG. 6. A plunger 128 and a rod retainer 129 similar to the construction shown in FIG. 14 are rigidly secured to the upper side of the lower cross brace 127. A vertically extending hole 131 is formed through the upper cross brace 126, and the plunger 128 is located to project through the hole 131 when the folding table assembly is in its open position.

To releasably grip the upper end of the plunger 128 when the table assembly is in its open position, a catch mechanism is provided comprising a pair of shoes 132 which are pivotally mounted in a housing 134 on laterally opposite side of the plunger 128 by pins 133. Each of the shoes 132 extends laterally inwardly from the associated pin 133 toward the plunger 128, and the lateral length of each shoe 132 is slightly greater than the distance from the associated pin 133 to the adjacent side of the plunger 128. Each shoe 132 normally slants inwardly and upwardly at a slight angle, and its inner end, which is rounded slightly as at 136, engages the adjacent sides of the plunger 128. Further, the laterally outer sides of the rod 128 are made flat as indicated at 147 in FIG. 19 to increase the area of contact between the plunger 128 and the shoes 132.

When the folding table assembly is moved from its folded position to its open position, the cross braces 126 and 127 move toward each other as previously explained and the plunger 128 moves upwardly through the hole 131 and between the two shoes 132. Such upward movement of the plunger 128 causes the curved inner ends of the two shoes 132 to swing upwardly slightly and slide along the sides of the plunger 128. However, subsequent attempted downward movement of the plunger 128 relative to the shoes 132 causes the curved ends 136 to wedge against the sides of the plunger 128 and prevent withdrawal of the plunger 128 from between the shoes 132.

While the weight alone of the shoes 132 may be sufficient to hold the inner ends of the shoes in engagement with the sides of the plunger 128, a spring 138 is preferably provided to urge the ends 136 against the plunger 128. The housing 134 encloses the shoes 132, and the spring 138 abuts the underside of the top of the housing. The spring 138, in the present instance, is a leaf spring. The end portions of the spring are reversely bent to extend above the shoes 132. The two shoes 132 are engaged by the end portions of the spring 138, and the spring 138 urges the shoes 132 to positions where their curved inner ends engage the sides of the plunger 128.

To disengage the shoes 132 from the plunger 128 for movement of the assembly to the folded position, a generally U-shaped release member 141 (FIGS. 16 and 19) is provided, the arms of the U extending underneath the inner end portions of the two shoes 132. The member 141 is supported by a release handle 142 and a pair of plates 143 which are secured as by welding to one end of the handle 142. A longitudinally extending hole is formed through one end of each plate 143, and one arm of the U-shaped member 141 is positioned through the holes in the plates 143 and under one shoe 132. The other arm of the member 141 is positioned on the adjacent end of the release handle 142 and under the other shoe 132. The handle 142 is pivotally mounted by a pin 146 on a vertically upwardly extending lug 144 which is rigidly secured to the upper side of the cross brace 126.

Figures 16, 17, 18, 19:
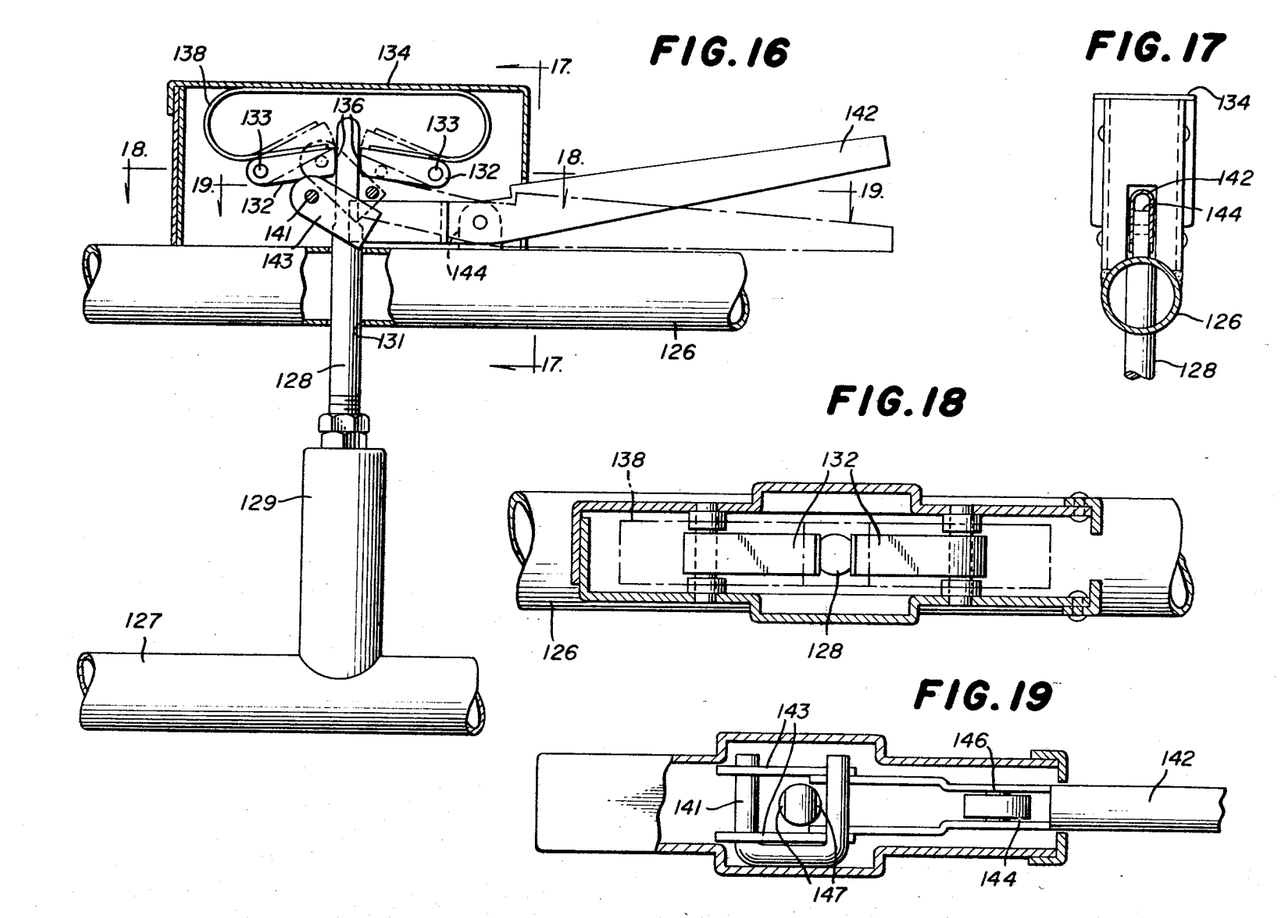
FIG. 16 is an enlarged view of another alternate form of the portion of the assembly shown in FIGS. 13 and 14.
FIG. 17 is a fragmentary sectional view taken on the line 17—17 of FIG. 16.
FIG. 18 is a fragmentary enlarged sectional view taken on the line 18—18 of FIG. 16.
FIG. 19 is an enlarged fragmentary sectional view taken on the line 19—19 of FIG. 16.

Assuming that the table is in its open position where the plunger 128 is between and being gripped by the shoes 132, the plunger 128 may be released for movement of the table assembly to its folded position by manually moving the outer end of the handle 142 downwardly to the dashed line position shown in FIG. 16. Such movement of the handle 142 swings its inner end and the member 142 upwardly causing the arms of the member 142 to engage the undersides of the two shoes 132. The inner ends of the shoes 132 then swing upwardly on the pins 133 and disengage the plunger 128. Subsequent release of the handle 142 enables the spring 142 to swing the inner ends of the shoes 132 downwardly once again and in position to engage the plunger 128 when the table is again moved to its open position.

While the catch mechanism shown in FIGS. 16 through 19 includes a pair of shoes both urged by the spring against the plunger, a single pivotally supported shoe on one side of the plunger, and a stationary backing block or support on the opposite side of the plunger, would also be satisfactory.

While an assembly may be provided with seat sections at only one side thereof, it is preferred that seat sections be provided on both sides. Further, each seat section may inclure different numbers of seats, and different kinds of seats may be provided. With reference to FIGS. 1 through 9, extending adjacent the longitudinal sides of the table top sections 32 and 33 are seat sections 151, 152, 153 and 154, the seat sections 151 and 153 being on opposite sides of the table top section 32 and the seat sections 152 and 154 being on opposite sides of the top section 33. In the present instance, each seat section comprises a pair of stools 156 and a support frame 157 for the stools. The support frames 157 are connected to and fold with the support frame 31 of the table, and they engage the floor in order to support the stools 156 when the assembly is in its open position.

Figures 7, 8, 9:
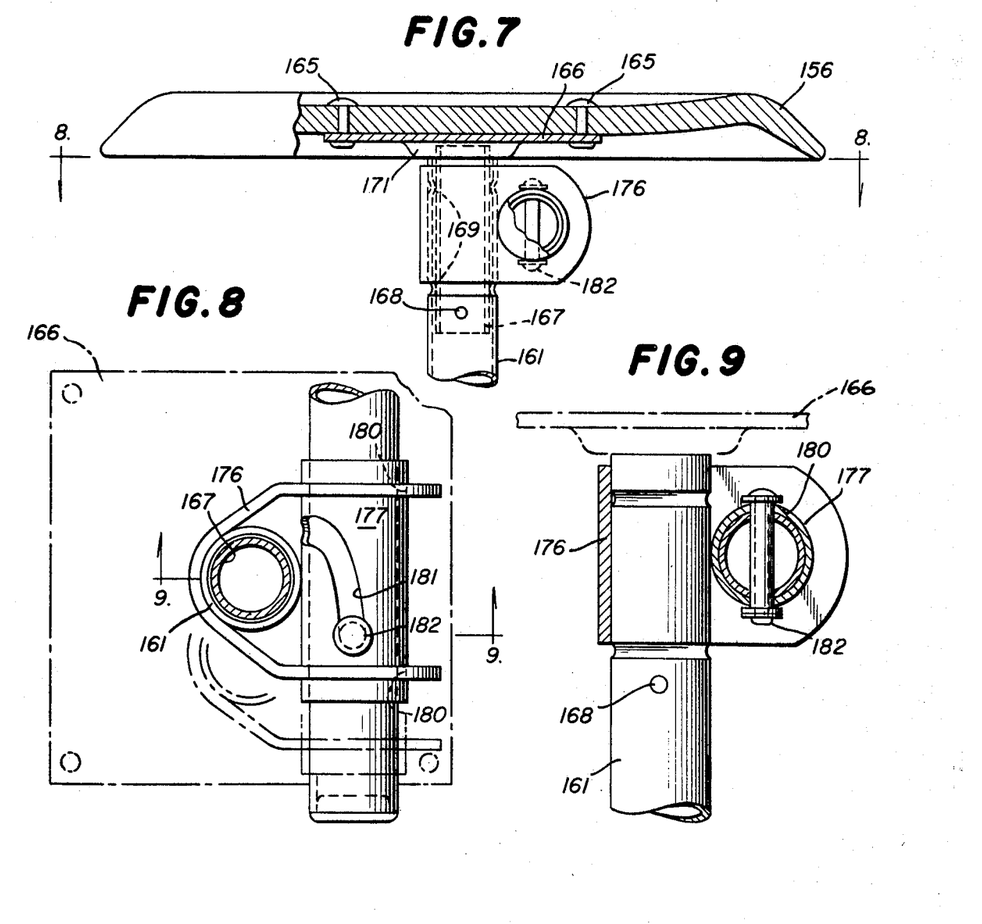
FIG. 7 is an enlarged fragmentary view partially in section showing a seat of the assembly.
FIG. 8 is a further enlarged fragmentary sectional view taken on the line 8—8 of FIG. 7.
FIG. 9 is a fragmentary sectional view taken on the line 9—9 of FIG. 8.

The support frame 157 for each seat section comprises a tubular leg 161 beneath each seat and a longitudinally extending brace 163 rigidly secured to the lower portions of the legs 161. The two legs 161 extend vertically and engage the floor when the assembly is open (FIG. 1), and swing to horizontal positions (FIGS. 3 and 4) as the assembly is moved to the folded position. Each stool 156 is supported on the upper end of its leg 161 by a generally flat mounting plate 166 (FIG. 7) and a mounting tube 167. The stool 156 is positioned on top of the plate 166 and secured thereto as by rivets 165, and the mounting tube 167 is rigidly secured to the center of the plate 166 and extends downwardly into the upper end of the tubular leg 161. The mounting tube 167 is fastened to the leg 161 as by a pin 168 which extends through the leg 161 and the mounting tube 167. As shown in FIGS. 7 and 9, the leg 161 has two inwardly extending beads 169 and the mounting tube 167 is sized to fit snugly within the inner surfaces of the beads 169, and thus hold the tube 167 steady. At its center, the mounting plate 166 is dished downwardly as at 171 (FIGS. 7 and 9) and this portion 171 rests on the upper end of the leg 161, thus supporting the plate 166 and the stool 156 on the leg 161.

To connect each seat section to the supporting frame 31 of the table, a generally U-shaped bracket 176 is rigidly secured as by welding to the upper end of each leg 161, the leg 161 being located within the opening of the U. As shown in FIG. 5, the two U-shaped brackets 176 of each seat section are positioned with their arms extending away from each other, and a laterally extending tubular pivot socket 177 is rigidly secured as by welding to the two arms of each bracket 176. As shown in FIGS. 8 and 9 holes 180 are formed through the arms of each bracket 176 and the pivot socket 177 is positioned in the holes and rigidly secured to the bracket 176.

With reference again to FIG. 5, at the outer ends of the table the sockets 177 are positioned such that the extensions 48 and 49 of the cross brace 42 of the end leg supports extend through the pivot sockets. Similarly, at the center of the table the sockets 177 are positioned such that the ends of the yoke-shaped connector members 60 and 60a extend therethrough, as shown in FIGS. 5 and 6. The sockets 177 are rotatable on the extensions 48 and 49 and on the arms of the connector members 60 and 60a, and consequently the seat sections are capable of pivoting relative to the outer end and center leg supports as shown in FIG. 3.

As shown in FIGS. 2 and 5, the stools 156 on each side of the table top sections are in longitudinal alignment, and the support frames for the stools are also in longitudinal alignment when the assembly is open. Further, FIGS. 3 and 4 show that it is necessary for the pair of support frames of the seat sections on each side of the assembly, to swing past each other into overlapping positions as the table is moved from its open position to its closed position. To shift the support frames from longitudinal alignment to positions where they may overlap as described, cam mechanisms are provided for effecting relative shifting movement laterally of the table of the seat sections. While this could be accomplished by shifting only one seat section, in the present instance one seat section is shifted in one direction as the table is folded and the other seat section is shifted in the opposite direction. Such lateral shifting of each seat section takes place automatically during approximately the first 45° of movement of the folding table assembly from its open position to its folded position, so that the legs 161 may clear each other by the time the assembly is folded to the position shown in FIG. 3. When the assembly is subsequently moved from the closed position to the open position, the seat sections are shifted in the opposite directions to place them in longitudinal alignment and such shift is accomplished in the last 45° of movement from the closed to the folded position.

The mechanism for laterally shifting each seat section is best shown in FIGS. 5 and 7 to 9. Diametrically opposite cam slots 181 are formed in each socket 177, and a pin 182 extends through both cam slots 181. At the outer ends of the assembly, the pins are secured to the extensions 48 and 49 and at the center of the assembly the pins are secured to the connector members 60 and 60a. Since the leg supports of the table do not turn as the assembly is moved between the open and folded positions whereas the seat sections and the pivot sockets 177 turn as the assembly is moved between the open and closed positions, each pin 182 turns through an angle of approximately 90° relative to the associated pivot socket 177 as the assembly is moved between the open and closed positions. As shown in FIGS. 5 and 8, the cam slots 181 for the seat sections 151 and 154 curve, when the assembly is open, from the pins laterally inwardly and toward the adjacent end of the assembly, and the cam slots for the seat sections 152 and 153 curve from the pins laterally outwardly and toward the adjacent end of the assembly. Thus, the seat sections 151 and 154 shift laterally outwardly from the solid line position to the dashed line position in FIG. 5, whereas the seat sections 152 and 153 shift laterally inwardly from the solid line position to the dashed line position, as the table is moved from the open position to the closed position. Further, as previously stated, the cam slots 181 are shaped to effect the shift from the solid line position to the dashed line position during approximately the first 45° of turning movement of the socket 177 relative to the pin 182. Consequently, by the time the folding table assembly reaches the position shown in FIG. 3 where the lower ends of the legs 161 approach each other, the lateral shift of each seat section has taken place and the legs 161 of each pair of seat sections clear each other and move into overlapping or side-by-side relation as the assembly is folded to the position shown in FIG. 4. Of course, when the assembly is subsequently moved from the folded position shown in FIG. 4 to the open position shown in FIG. 1, the seat sections shift in the reverse direction and the previously described longitudinal alignment of the stools and the supporting frames for the stools is once again attained.

As stated previously, the caster carrying legs 41 and 41a of the two outer end leg supports are displaced longitudinally and laterally outwardly from the remainder of the center leg supports, and such displacements, or spreading of the legs, is advantageous when the assembly is in its folded position (FIG. 4) because the spread of the legs add stability to the assembly. Cups 162 are attached to the lower ends of the legs 161 and engage the floor when the assembly is in open position to support the stools. Such engagement also tends to stabilize the assembly when in its open position because the cups 162 prevent the ends of the table from moving on the casters 44. Further, as shown in FIG. 1, the casters 44 are displaced longitudinally outwardly from the end most of the legs 161 of the seat sections. Such construction is advantageous because the cups 162 attached to the lower ends of the legs 161 immediately rise off the floor in the initial movement of the assembly from the open position to the folded position, with the result that the cups 162 cannot drag on the floor during closing and opening movements of the assembly. If the cups 162 were displaced longitudinally outwardly from the casters 44, they would remain in engagement with the floor during initial movement of the assembly to the closed position and retard such closing movements since it is necessary for the outer end leg supports of the assembly to move together as the assembly is moved from the open position to the folded position.

The seat sections disclosed herein have the further advantage that the pair of seat sections on one side of the assembly is exactly the same as the pair of seat sections on the opposite side of the assembly. Thus, only one frame design is required. Further, the support frames for the seat sections are sturdy without being unduly complex because the leg 161 for each seat is located directly under the center of the seat. With such a balanced construction, the support frames for the seat sections may be made relatively simple and yet sturdy enough to adequately support the seats.

When the table assembly has been moved to the closed or folded position, it may be locked therein by means of a latch 191 (FIGS. 3 and 4) attached to one of the pins 63 on an apron 61. A finger 192 is secured to the latch 191 and extends downwardly therefrom into engagement with the adjacent link 62 in order to hold the latch 191 in a substantially horizontal position as the assembly is moved between its open and closed position. At its longitudinally inner end, a notch 193 is formed in the latch 191, which is adapted to engage a laterally outwardly extending pin 194 at the opposite end of the assembly, thus holding the assembly in its closed or folded position as shown in FIG. 4. To move the assembly to its open position, the latch 191 is pivoted in the counter-clockwise direction as seen in FIG. 4 to disengage the latch 191 from the pin 194.

FIGS. 20 through 24 show a generally similar folding table assembly but including an alternate seat construction. Whereas each seat section in the construction illustrated in FIG. 1 included two stools and a support leg for each stool, each seat section in the construction shown in FIGS. 20 through 24 includes three chairs and a support leg for each chair. The table portion of the assembly and the connections with the seat sections may be exactly the same as the corresponding parts of the construction illustrated in FIGS. 1 through 6, and consequently the same reference numerals are used for these parts.

Figure 20:
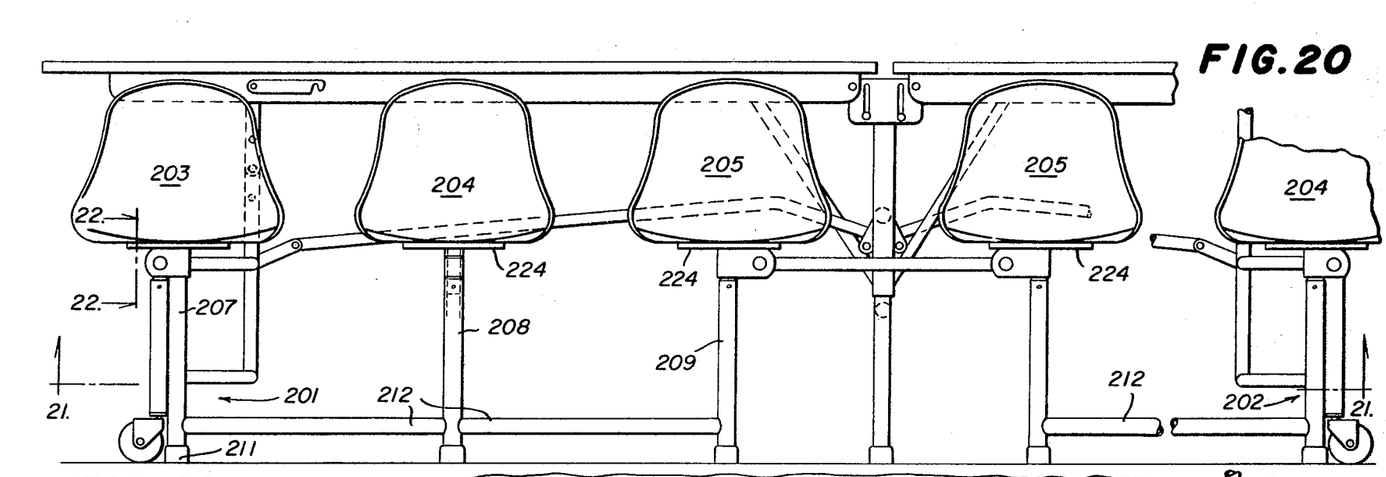
FIG. 20 is a fragmentary elevational view generally similar to FIG. 1 but showing an alternate form of the assembly.
Figure 21:
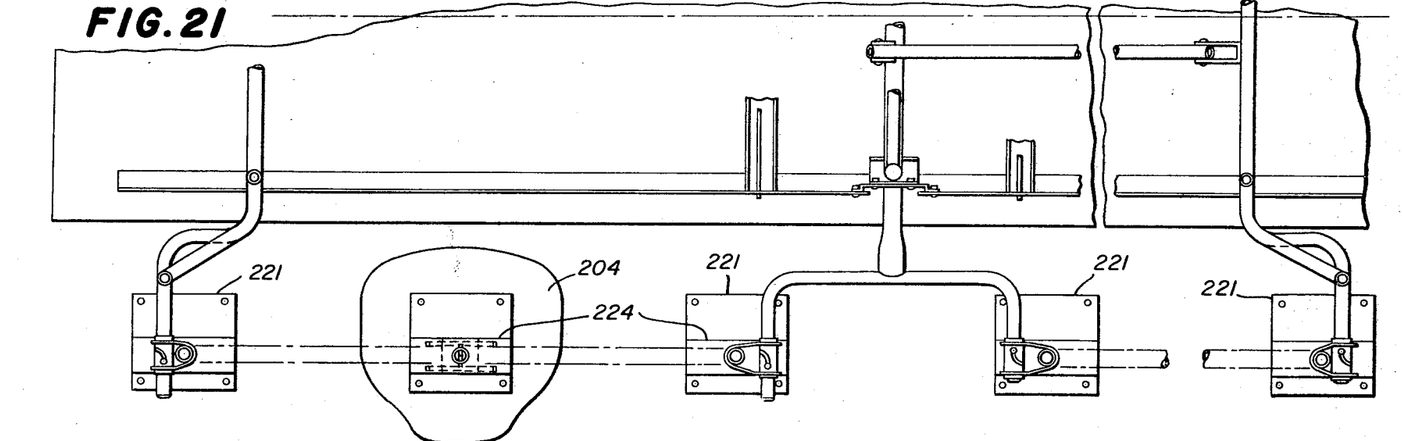
FIG. 21 is a fragmentary sectional view taken on the line 21—21 of FIG. 20.
Figure 22:
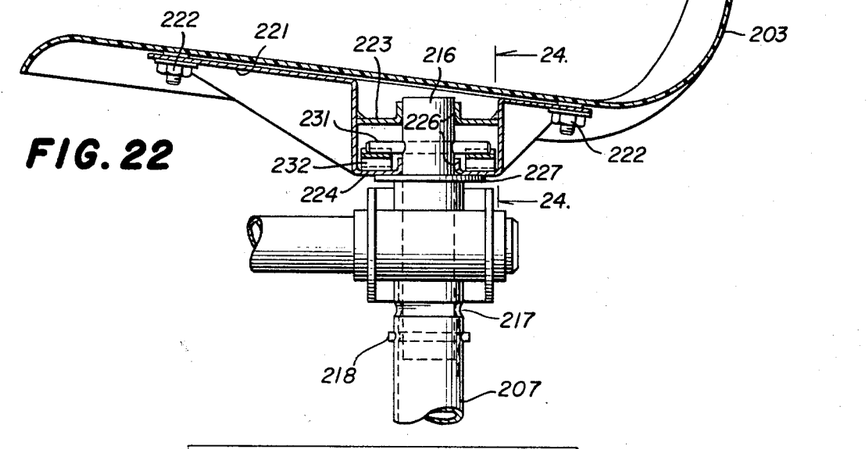
FIG. 22 is a fragmentary enlarged sectional view taken on the line 22—22 of FIG. 20.

With reference to FIGS. 20 and 21, on each side of the table are provided support frames 201 and 202, and three chairs 203, 204 and 205 for each support frame. The chairs 203 are located adjacent the outer ends of the table, the chairs 205 are located adjacent the center leg supports of the table, and the chairs 204 are located between the chairs 203 and 205. Tubular support legs 207, 208 and 209 are provided for the chairs 203, 204 and 205, respectively, the legs extending from the chairs vertically downwardly and engaging the floor when the assembly is in its open position. Again, cups 211 are preferably fastened to the lower ends of the legs 207 to 209. Further, longitudinally extending braces 212 are secured to the legs 207 to 209 adjacent the lower ends of the legs to rigidly secure them together.

At the upper end of each leg 207 to 209 is fastened a chair which may be rotated to permit a person to sit on a chair when facing away from the table and then turned to face the table. Such function is accomplished by a mechanism including a tube 216 (FIGS. 22 to 24) which extends into the upper end of the associated leg. The leg 207, shown in FIG. 22, has at least one inwardly rolled annular portion 217 which engages the outer surface of the tube 216 and holds the tube 216 steady, a pin 218 being provided to fasten the tube 216 to the leg 207. The chair 203, which may be a molded plastic member, is positioned on and fastened by bolts 222 to a support bracket 221. The bracket 221 includes a pair of vertically spaced plates 223 and 224 which extend around the upper end of a tube 216. Vertically aligned flanged openings 226 are formed through the two plates 223 and 224, the openings 226 receiving the upper end of the tube 216 in sliding engagement therewith. A washer 227 is preferably located around the tube 216 between the upper end of the leg 207 and the underside of the lowermost plate 224. Thus, the washer 227 is supported by the upper end of the tube 207 and the bracket 221, which supports the chair 203, is supported on the washer 227. By this construction, the chair 203 and the bracket 221 may be rotated on the tube 216 about the axis of the leg 207 and the tube 216. Such rotative movement is desirable because a person may turn a chair to face it laterally outwardly away from the table so that he may sit down, and then, while sitting on the chair, turn the chair 180° so that he is facing the table.

Figure 23:
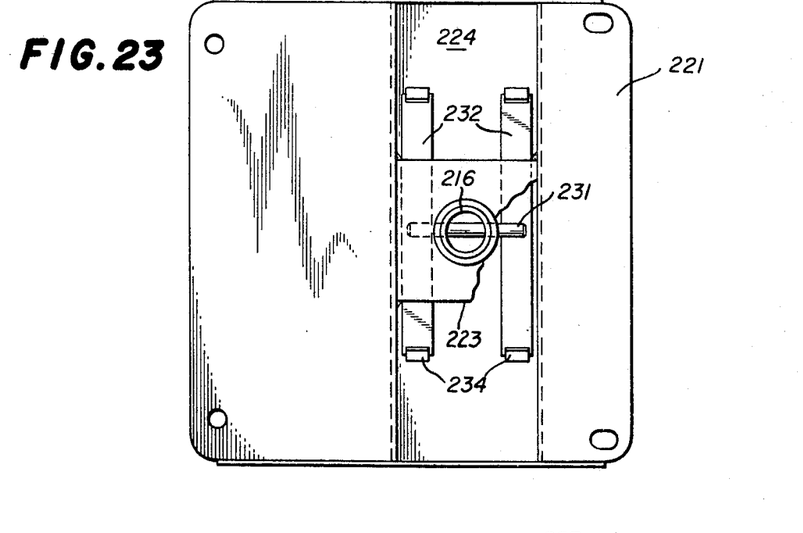
FIG. 23 is a fragmentary view of a portion of the structure shown in FIG. 22.
Figure 24:
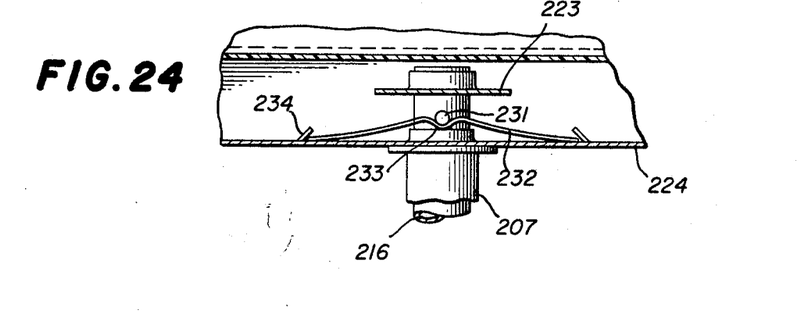
FIG. 24 is a fragmentary sectional view taken on the line 24—24 of FIG. 22.

It is preferred that restraining means be provided to releasably hold the chair in a first position where it is facing the table and in a second position, displaced 180° from the first position, where it is facing away from the table. Such restraining means comprises a horizontal pin 231 (FIGS. 22 through 24) which is secured to the tube 216 and extends diametrically therethrough and beyond the sides thereof, and a pair of leaf springs 232. The springs are fastened to the lowermost plate 224 of the bracket 221 below the ends of the pin 231, the two leaf springs 232 extending generally parallel to each other on opposite sides of the tube 216. As is also shown in FIGS. 23 and 24, each leaf spring 232 is fastened to the plate 224 by upwardly extending tabs 234 which are narrower than and angle upwardly in the direction of the associated leaf spring 232, the ends of each leaf spring being held underneath a pair of tabs 234. Each leaf spring is bowed upwardly (FIG. 24), and a downwardly bent portion or depression 233 is formed at the center of each leaf spring. The depressions 233 in the leaf springs 232 are located on opposite sides of the tube 216 and the pin 231 is located such that the ends thereof extend into the two depressions 233 both when the chair is facing the table and also when the chair is turned 180° and is facing away from the table. Thus, when the chair is facing the table, both ends of the pin 231 extend into the depressions 233 and the chair is restrained from rotative movement by the depressions. However, a turning force on the chair 203 will cause the springs 232 to flex and permit the ends of the pin 231 to slide out of the depressions 233. The chair will then turn freely until it reaches the opposite position where the ends of the pin are again engaged by the depressions 233.

It will be apparent that an assembly constructed in accordance with the invention has numerous advantages. The support frame for each seat section is centered underneath the associated seats, thus simplifying the construction of the support frames for the seat sections and the attachment of the seats to the support frames. Both the seats and the support frame of each pair of sections are aligned longitudinally of the assembly when in its open position. Nevertheless, the seat sections of each pair do not interfere with each other as the table is being folded because of the provision of means for shifting the seat sections of each pair into laterally offset positions relative to each other.

While, in the present construction, both seat sections of each pair are shifted, it will be apparent that means could be provided to shift only one seat section of each pair, but of course such means would have to be capable of shifting that one seat section a greater distance than the distance each section is shifted in the construction illustrated.

The construction of the seat sections is further advantageous in that different types of seats, such as tools or chairs, may be attached to a given support frame. Further, either rotatable chairs or non-rotatable stools may be fastened to a given support frame, and folding table assemblies of different lengths may have different numbers of chairs or stools.

Still other advantages of the assembly lie in the rotatable mounting for the chairs, the adjustment for the height of the table top sections, the location of the casters relative to the legs of the seat sections so that the seat sections immediately rise off the floor as the assembly is moved to the folded position, and the mechanism for releasably locking the assembly in the folded position.

We claim:
1. A folding table assembly comprising a pair of table top sections, top support means for supporting said top sections and for hingedly connecting said top sections together for movement between open and closed positions of said assembly, a pair of seat sections attached to said top support means on one side of said table assembly, said seat sections extending in opposite directions from the hinge connection between said top sections, each of said seat sections including at least one seat and a supporting frame for said seat, said seats of said pair of seat sections being in longitudinal alignment and said supporting frames of said pair of seat sections also being in longitudinal alignment when said assembly is in open position, and means connected to said supporting frame of at least one of said seat sections for laterally shifting said supporting frame of said one seat section relative to the supporting frame of the other of said seat sections, said lateral shifting enabling said table assembly to be folded to closed position without interference between the supporting frames of said seat sections.

2. An assembly as in claim 1, wherein a pair of seat sections is attached to said top support means on each side of said table, said two pairs of seat sections being identical.

3. An assembly as in claim 1, wherein said shifting means is connected to shift both seat sections of said pair, one of said seat sections being shifted laterally inwardly and the other of said seat sections being shifted laterally outwardly.

4. An assembly as in claim 1, wherein said shifting means is automatically actuated by movement of said assembly between said open and closed positions of said assembly.

5. An assembly as in claim 1, wherein said table top sections and said seat sections turn through an angle of approximately 90° as said assembly is moved from said open to said folded position, and said shifting means shifts said seat section within approximately the first 45° of movement of said assembly from said open to said closed positions.

6. A folding table assembly comprising a pair of table top sections, a top support frame hingedly connecting said top sections together and supporting said top sections in said end-to-end relation when said assembly is in open position and supporting said top sections in generally parallel vertical planes when said assembly is in closed position, a pair of seat sections in substantially longitudinal alignment along one longitudinal side of said top sections, said seat sections being on opposite sides of said hinge connection of said top sections, means for pvotally connecting said seat sections to said top support frame such that said seat sections turn with said top sections and are generally parallel to said top sections when said assembly is in both said open and said closed positions, and shifting means for laterally shifting said one seat section relative to said top sections and the other of said seat sections to move said seat sections out of longitudinal alignment as said assembly is moved from said open position to said closed position.

7. A folding table assembly as in claim 6 wherein said shifting means engages said pivotal connecting means and said seat section and is actuated by turning movement of said assembly between said open and closed positions.

8. A folding table assembly as in claim 6, wherein said pivotal connecting means comprises lateral extensions on said top support frame and sockets attached to said seat sections and pivotally engaging said extensions, and said shifting means comprises cam means on said extensions and said sockets.

9. A folding table assembly as in claim 8, wherein said cam means comprises a pin on each of said extensions and a cam surface on each of said sockets engaged by said pin.

10. A folding table assembly comprising a pair of table top sections positioned in end-to-end relation when in open position, top support means hingedly connecting said top sections together and supporting said top sections for folding movements between open and closed positions, a pair of seat sections positioned in end-to-end relation and extending along one side of said top sections, and means for connecting said seat sections to said top sections and for laterally shifting at least one of said seat sections relative to the other of said seat sections, said shifting of said seat section being actuated by said folding movement of said top sections.

11. A folding table assembly as in claim 10, wherein said top support means includes a center leg support and two outer end leg supports, said connecting and shifting means extending from said center and end leg supports to said seat sections.

12. A folding table assembly movable between open and closed positions, comprising a pair of table top sections positioned in end-to-end relation when said assembly is in said open position, a pair of outer end leg supports positioned under the remote ends of said sections, a center leg support positioned under the adjacent ends of said sections, and height adjusting means pivotally connected to said pair of top sections and adjustably connected to said end and center leg supports for vertically adjusting the height of said table top sections, the connection between said center leg support and said top sections including a plurality of links for maintaining said center leg support substantially vertical as said assembly is moved between said open and closed positions.

13. An assembly as in claim 12, wherein said last named means comprises an adjusting block pivotally connected to said links, and screw means rotatably connected to said one leg support and threadedly engaging said adjusting block for making said vertical adjustment.

14. A table and seat assembly comprising a table top section, top support means for supporting said table top section, at least one chair, chair support means positioned adjacent said top section and connected to said top support means, said chair being rotatably connected to said chair support means, and restraining means for releasably holding said chair in one position where said chair faces said top section.

15. An assembly as in claim 14, wherein said restraining means further releasably holds said chair in a second position which is angularly spaced approximately 180° from said one position.

16. An assembly as in claim 14, wherein said restraining means comprises a spring connected to and rotatable with said chair, and means secured to said chair support means and engaging said spring when said chair is facing said top section.

17. A folding table assembly movable between open and closed positions, comprising a pair of table top sections positioned in end-to-end relation when in open position, outer end leg supports pivotally connected to the remote ends of said sections, a center leg support comprising an upper portion connected to the adjacent ends of said top sections and a lower section movably connected to said upper portion, link means pivotally connected to said top sections and to said lower portion for holding said center leg support substantially vertical and for moving said lower portion relative to said upper portion during movement between open and closed positions, and means for locking said assembly in said open position comprising a plunger connected to one of said portions and a catch mechanism connected to the other of said portions, said plunger and said catch mechanism moving toward and away from each other as said assembly is moved between said open and closed positions, said catch mechanism including a pivotally mounted shoe on at least one side of said plunger for engaging and holding said plunger when said assembly is in said open position.

18. An assembly as in claim 17, wherein said catch mechanism includes two pivotally mounted shoes on diametrically opposite sides of said plunger, said shoes engaging and holding said plunger when said assembly is in said open position.

19. An assembly as in claim 17, wherein said catch mechanism further includes spring means for urging said shoe into position to engage said plunger.

20. An assembly as in claim 17, wherein said catch mechanism further includes release means for pivoting said shoe out of engagement with said plunger to permit said assembly to be moved to said open position.

References Cited

UNITED STATES PATENTS

| 2,495,674 | 1/1950 | Lewis | 248—410 |
| 3,055,705 | 9/1962 | Wilson | 297—159 |
| 3,099,481 | 7/1963 | Bue | 297—159 |
| 3,109,678 | 11/1963 | Wilson | 297—159 |
| 3,286,663 | 11/1966 | Mann et al. | 248—410 X |
| 3,337,262 | 8/1967 | Katzfey et al. | 297—159 |

JAMES T. McCALL, Primary Examiner

U.S. Cl. X.R.

108—113, 144